(12) United States Patent
Freeman et al.

(10) Patent No.: US 7,549,048 B2
(45) Date of Patent: Jun. 16, 2009

(54) EFFICIENT AND SECURE AUTHENTICATION OF COMPUTING SYSTEMS

(75) Inventors: Trevor William Freeman, Sammamish, WA (US); Timothy M. Moore, Bellevue, WA (US); Bernard D. Aboba, Bellevue, WA (US); Daniel R. Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 691 days.

(21) Appl. No.: 10/804,591

(22) Filed: Mar. 19, 2004

(65) Prior Publication Data

US 2005/0210252 A1 Sep. 22, 2005

(51) Int. Cl.
*H04L 9/00* (2006.01)
(52) U.S. Cl. .......................... 713/171; 726/6
(58) Field of Classification Search ............. 726/5–10; 713/171
See application file for complete search history.

(56) References Cited

U.S. PATENT DOCUMENTS

| | | | | | |
|---|---|---|---|---|---|
| 5,345,594 | A | * | 9/1994 | Tsuda ......................... | 455/18 |
| 6,161,139 | A | * | 12/2000 | Win et al. ................... | 709/225 |
| 6,182,142 | B1 | * | 1/2001 | Win et al. ................... | 709/229 |
| 6,636,966 | B1 | * | 10/2003 | Lee et al. .................... | 713/165 |
| 6,668,322 | B1 | | 12/2003 | Wood et al. ................. | 713/182 |
| 6,807,569 | B1 | * | 10/2004 | Bhimani et al. ............. | 709/217 |
| 6,845,395 | B1 | * | 1/2005 | Blumenau et al. .......... | 709/223 |
| 6,862,699 | B2 | * | 3/2005 | Nakashima et al. ......... | 714/701 |
| 6,892,307 | B1 | * | 5/2005 | Wood et al. .................... | 726/8 |
| 6,907,546 | B1 | * | 6/2005 | Haswell et al. ............... | 714/38 |
| 6,912,522 | B2 | * | 6/2005 | Edgar ............................ | 707/2 |
| 6,944,761 | B2 | * | 9/2005 | Wood et al. ................. | 713/155 |
| 6,983,381 | B2 | * | 1/2006 | Jerdonek ........................ | 726/5 |
| 6,996,714 | B1 | * | 2/2006 | Halasz et al. ............... | 713/163 |

(Continued)

FOREIGN PATENT DOCUMENTS

WO   WO 01/82037   2/2001

(Continued)

OTHER PUBLICATIONS

Matt Powell, WS-Security Authentication and Digital signatures with Web Services Enhancements, Dec. 2002, Microsoft Coporation, pp. 1-26.*

(Continued)

*Primary Examiner*—Emmanuel L Moise
*Assistant Examiner*—Jeffery Williams
(74) *Attorney, Agent, or Firm*—Workman Nydegger

(57) ABSTRACT

The principles of the present invention relate to systems, methods, and computer program products for more efficiently and securely authenticating computing systems. In some embodiments, a limited use credential is used to provision more permanent credentials. A client receives a limited-use (e.g., a single-use) credential and submits the limited-use credential over a secure link to a server. The server provisions an additional credential (for subsequent authentication) and sends the additional credential to the client over the secure link. In other embodiments, computing systems automatically negotiate authentication methods using an extensible protocol. A mutually deployed authentication method is selected and secure authentication is facilitated with a tunnel key that is used encrypt (and subsequently decrypt) authentication content transferred between a client and a server. The tunnel key is derived from a shared secret (e.g., a session key) and nonces.

22 Claims, 4 Drawing Sheets

U.S. PATENT DOCUMENTS

| | | | |
|---|---|---|---|
| 7,035,442 B2 * | 4/2006 | Ha et al. .................... | 382/124 |
| 7,058,696 B1 * | 6/2006 | Phillips et al. .............. | 709/217 |
| 7,069,437 B2 * | 6/2006 | Williams .................... | 713/166 |
| 7,085,840 B2 * | 8/2006 | de Jong et al. .............. | 709/229 |
| 7,085,931 B1 * | 8/2006 | Smith et al. ................. | 713/182 |
| 7,103,772 B2 * | 9/2006 | Jorgensen et al. ........... | 713/168 |
| 7,114,080 B2 * | 9/2006 | Rahman et al. ............. | 713/186 |
| 7,158,777 B2 * | 1/2007 | Lee et al. .................... | 455/411 |
| 7,181,762 B2 * | 2/2007 | Jerdonek ...................... | 726/2 |
| 7,275,156 B2 * | 9/2007 | Balfanz et al. .............. | 713/168 |
| 7,275,157 B2 * | 9/2007 | Cam Winget ............... | 713/168 |
| 7,458,095 B2 * | 11/2008 | Forsberg ....................... | 726/3 |
| 2001/0022780 A1 * | 9/2001 | Mizutani et al. ............ | 370/261 |
| 2002/0059545 A1 * | 5/2002 | Nakashima et al. .......... | 714/43 |
| 2002/0087857 A1 * | 7/2002 | Tsao et al. .................. | 713/155 |
| 2002/0095569 A1 * | 7/2002 | Jerdonek .................... | 713/155 |
| 2002/0116611 A1 * | 8/2002 | Zhou et al. .................. | 713/156 |
| 2002/0161826 A1 * | 10/2002 | Arteaga et al. .............. | 709/203 |
| 2003/0005117 A1 * | 1/2003 | Kang et al. ................. | 709/225 |
| 2003/0041244 A1 * | 2/2003 | Buttyan et al. .............. | 713/172 |
| 2003/0055962 A1 * | 3/2003 | Freund et al. ............... | 709/225 |
| 2003/0055974 A1 * | 3/2003 | Brophy et al. .............. | 709/227 |
| 2003/0084293 A1 * | 5/2003 | Arkko et al. ................ | 713/168 |
| 2003/0090998 A1 * | 5/2003 | Lee et al. .................... | 370/229 |
| 2003/0093676 A1 * | 5/2003 | Kawamura et al. .......... | 713/175 |
| 2003/0115324 A1 * | 6/2003 | Blumenau et al. ........... | 709/225 |
| 2003/0169883 A1 * | 9/2003 | Leroux et al. ............... | 380/277 |
| 2003/0172090 A1 * | 9/2003 | Asunmaa et al. ............ | 707/200 |
| 2003/0177390 A1 * | 9/2003 | Radhakrishnan ............ | 713/201 |
| 2003/0226017 A1 * | 12/2003 | Palekar et al. ............... | 713/168 |
| 2004/0088409 A1 * | 5/2004 | Braemer et al. ............. | 709/225 |
| 2004/0088582 A1 * | 5/2004 | Hovmark et al. ............ | 713/201 |
| 2004/0098588 A1 * | 5/2004 | Ohba et al. .................. | 713/169 |
| 2004/0107360 A1 * | 6/2004 | Herrmann et al. ........... | 713/201 |
| 2004/0117818 A1 * | 6/2004 | Karaoguz et al. ............. | 725/31 |
| 2004/0122956 A1 * | 6/2004 | Myers et al. ................. | 709/228 |
| 2004/0148504 A1 * | 7/2004 | Forsberg ..................... | 713/168 |
| 2005/0015588 A1 * | 1/2005 | Lin et al. ..................... | 713/159 |
| 2005/0088999 A1 * | 4/2005 | Waylett et al. ............... | 370/338 |
| 2005/0114713 A1 * | 5/2005 | Beckman et al. ............ | 713/202 |
| 2005/0120213 A1 * | 6/2005 | Winget et al. ............... | 713/171 |
| 2005/0165953 A1 * | 7/2005 | Oba et al. .................... | 709/238 |
| 2005/0172175 A1 * | 8/2005 | Bhat et al. ..................... | 714/43 |
| 2005/0188211 A1 * | 8/2005 | Scott et al. .................. | 713/183 |
| 2005/0216555 A1 * | 9/2005 | English et al. ............... | 709/204 |
| 2006/0067272 A1 * | 3/2006 | Wang et al. .................. | 370/331 |
| 2006/0200681 A1 * | 9/2006 | Kato et al. ................... | 713/193 |

FOREIGN PATENT DOCUMENTS

WO     WO 03/038578     10/2002

OTHER PUBLICATIONS

Haller et al. One-Time Password System, Feb. 1998, RFC Working Group, pp. 1-24.*

Simpson W., PPP Chalenge Handshake Authentication Protocol (CHAP), Aug. 1996, RFC Working Group, pp. 1-13.*

Salgarelli et al., EAP-Shared Key Exchange (EAP-SKE): A Scheme for Authentication and Dynamic Key Exchange in 802.1x Networks, Apr. 30, 2002, pp. 2-3, 8-10 and 17-18.*

Aboba, et al., "PPP EAP TLS Authentication Protocol", RFC 2716, 1999, p. 1-24.*

Dierks et al., "The TLS Protocol Version 1.0", RFC 2246, 1999, p. 1-80.*

Blunk et al., "PPP Extensible Authentication Protocol (EAP)", RFC 2284, 1998, p. 1-15.*

Anderson et al., "Protected EAP Protocol (PEAP)", PPPEXT Working Group, 2002, p. 1-42.*

Hess et al., "Advanced Client/Server Authentication in TLS," Network and Distributed System Security Symposium, San Diego, CA, Feb. 2002. http://citeseer.ist.psu.edu/hess02advanced.html.*

* cited by examiner

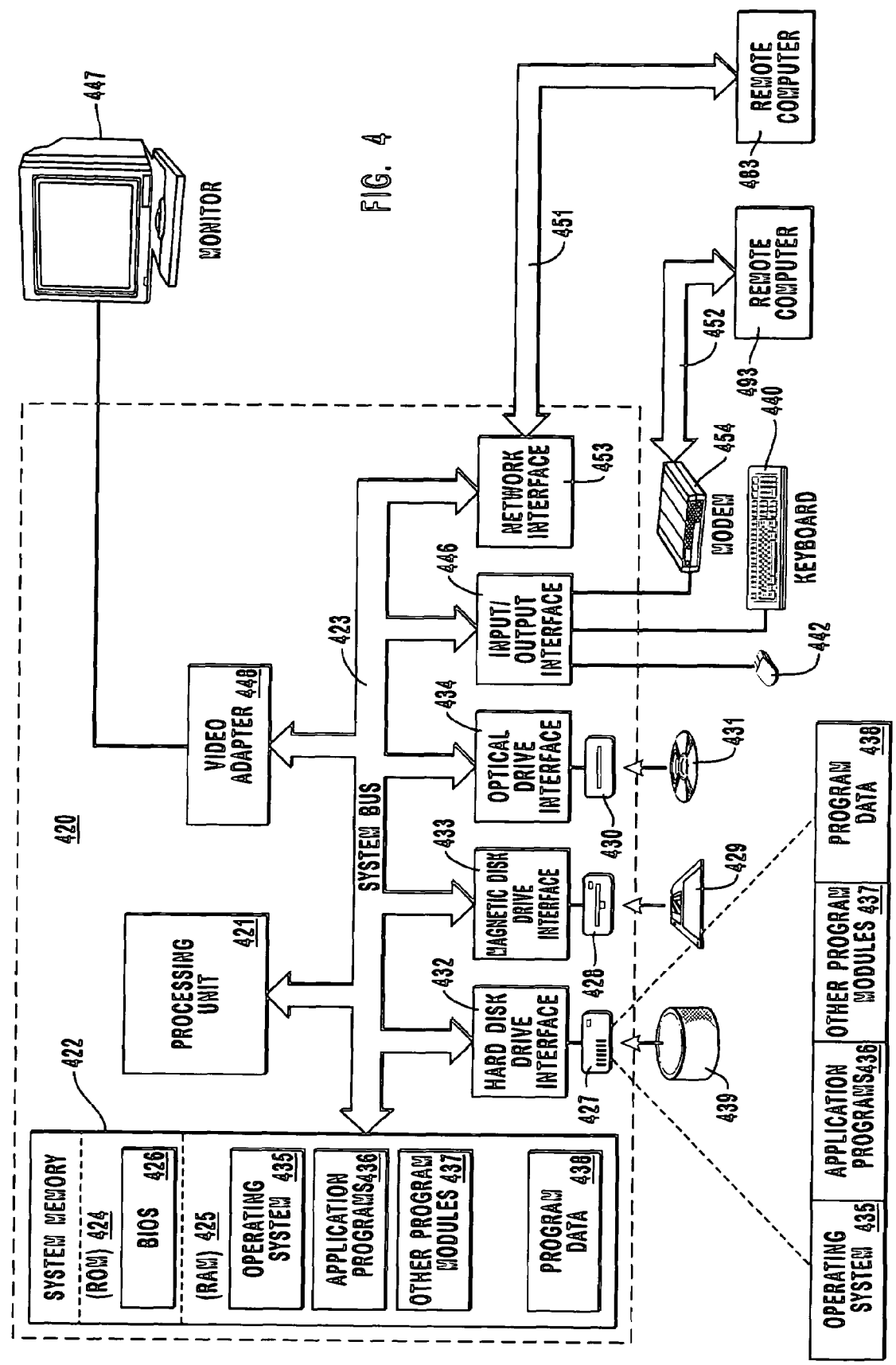

EFFICIENT AND SECURE AUTHENTICATION OF COMPUTING SYSTEMS

BACKGROUND OF THE INVENTION

1. The Field of the Invention

The present invention relates to extensible authentication and credential provisioning. More specifically, the present invention relates to automated negotiation of authentication mechanisms and limited-use credentials that can be used to provision additional credentials.

2. Background and Related Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form computer networks over which the computer systems can communicate electronically to share data. As a result, many of the tasks performed at a computer system (e.g., accessing electronic mail and web browsing) include electronic communication with one or more other computer systems via a computer network (e.g., the Internet).

In order for one computer system to communicate electronically with another computer system, the computer system, as well as a corresponding computer system user, may need to authenticate with (i.e., prove its identity to) the other computer system (or a computer system that authorizes access to the other computer system. Depending on the environment, any of a wide variety of different computerized authentication mechanisms, such as, for example, Kerberos, Secure Sockets Layer ("SSL"), NT LAN Manager ("NTLM"), and/or Digest authentication, can be used.

Some authentication mechanisms include an interactive logon. For example, before a computer system can communicate electronically on the Internet, a user of the computer system is often required to log-in with an Internet Service Provider (hereinafter referred to as an "ISP") that can authorize access to the Internet. Logging-in with an ISP typically includes a submission of user credentials (e.g., a username and a password) from the computer system to the ISP. Upon receiving the credentials, the ISP compares the credentials to a credentials database and if the credentials are appropriate the computer system is authorized to communicate with the Internet.

Unfortunately, there is always some risk of unauthorized users obtaining an authorized User's credentials and using the credentials to impersonate the authorized user. Since an authorized user's credentials essentially allow full access to all of authorized users resources on a particular system (e.g., files, electronic messages, personal and financial data, etc.), any compromise in credentials can provide an unauthorized user with the ability to copy and destroy the authorized user's resources. In particular, passwords are vulnerable to guessing attacks, for example, from programs that sequentially submit each word in a dictionary as a password (commonly referred to as "dictionary attacks").

Other authentication mechanisms do not include an interactive logon and thus there are no user credentials that can be obtained. For example, a Web server can prove its identity to a Web client using SSL. When the Web client contacts a secured Web page at the Web server (e.g., a page beginning with "https:"), the Web server responds, automatically sending a digital certificate that authenticates the Web server. The Web client generates a unique session key to encrypt all communication with the Web server. The Web client encrypts the session with the Web server's public key (e.g., referenced in the certificate) so only the Web server can read the session key. Thus, a secure session is established without requiring any user actions.

Although examples of interactive authentication and non-interactive authentication mechanisms have been described, it should be understood that implementations of interactive authentication and non-interactive authentication can vary between networks and computer systems. For example, one network may be configured to use Kerberos authentication, while another network is configured to use some other interactive authentication mechanism. Further, a particular authentication mechanism can have different configuration options that cause the authentication mechanism to operate differently. For example, some implementations of SSL allow different encryption algorithms to be selected when establishing a secure session.

Unfortunately, it can be difficult or even impossible, to determine the authentication mechanism and/or configuration options a computer system or network has deployed. Thus, one computing system may attempt to authenticate with another computer system using an authentication mechanism and/or configuration option that is not deployed at the other computer system. As a result, authentication can fail and prevent the computing systems from communicating.

The potential for attempting to authenticate using an undeployed authentication mechanism is especially high in distributed systems. Distributed systems often include a number of interconnected computer systems and networks, where various portions of the distributed system are under the control of different entities. These different entities may each deploy different authentication mechanisms and may not necessarily advertise or publish an indication of the authentication mechanisms that are deployed. Thus, a first component of the distributed system may be prevented from authenticating with a second component of the distributed system because the first component does not know (and may have no way to determine) the authentication mechanisms deployed at the second component.

Other authentication problems can occur in wireless environments. For example, for a device to wirelessly authenticate with a mixed wired/wireless network, the device may be required to a have a certificate corresponding to the network. However, the network may be configured to allow only authenticated devices to access the certificate. Thus, the device may be required to initially connect to the network via a wired connection. Requiring a wired connection for access to a certificate can burden a user (e.g., a user may need to locate a network tap) and in some environments may be difficult (e.g., network taps may be in restricted access location) or even impossible (e.g., some devices are not configured for wired network access). Accordingly, even authorized users may be prevented from wirelessly accessing a network.

Therefore, what would be advantageous are mechanisms for automatically negotiating authentication methods and more securely provisioning of credentials.

BRIEF SUMMARY OF THE INVENTION

The foregoing problems with the prior state of the art are overcome by the principles of the present invention, which are directed to more efficiently and securely authenticating computing systems. In some embodiments, a client computing system receives a limited-use credential. The client computing system and a server computing system establish a secure link between one another. The client computing system submits the limited-use credential to the server computing system over the established secure link.

The server computing system receives the limited-use credential from the client computing system over the established secure link. The server computing system provisions an additional credential for the client computing system based on the received limited-user credential. The server computing system sends the additional credential to the client computing system over the established secure link. The client computing system receives the additional credential from the server computing system. Optionally, the client computing system subsequently uses the received additional credential to authenticate with the server computing system.

In other embodiments, a server sends a first request that includes at least the authentication mechanisms deployed at the server computing system. The client receives the first request and sends a first response that includes at least the authentication mechanisms deployed at the client computing system. The client and server identify a tunnel key that can be used to encrypt content transferred between the client computing system and server computing system.

The server sends a second request that includes encrypted authentication content (encrypted with the tunnel key) indicating a mutually deployed authentication mechanism. The client receives the second request and decrypts the encrypted authentication content with the tunnel key to reveal unencrypted authentication content. The unencrypted authentication content indicating the mutually deployed authentication mechanism. The client sends a second response including encrypted response data that is the response to the unencrypted authentication content. The encrypted response data contains information for authenticating with the server according to the mutually deployed authentication mechanism. The server receives the second response including the encrypted response data that contains information for authenticating with the server according to the mutually deployed authentication mechanism.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates a suitable operating environment for implementing the principles of the present invention.

DETAILED DESCRIPTION OF THE PREFERRED EMBODIMENTS

Figure 1:
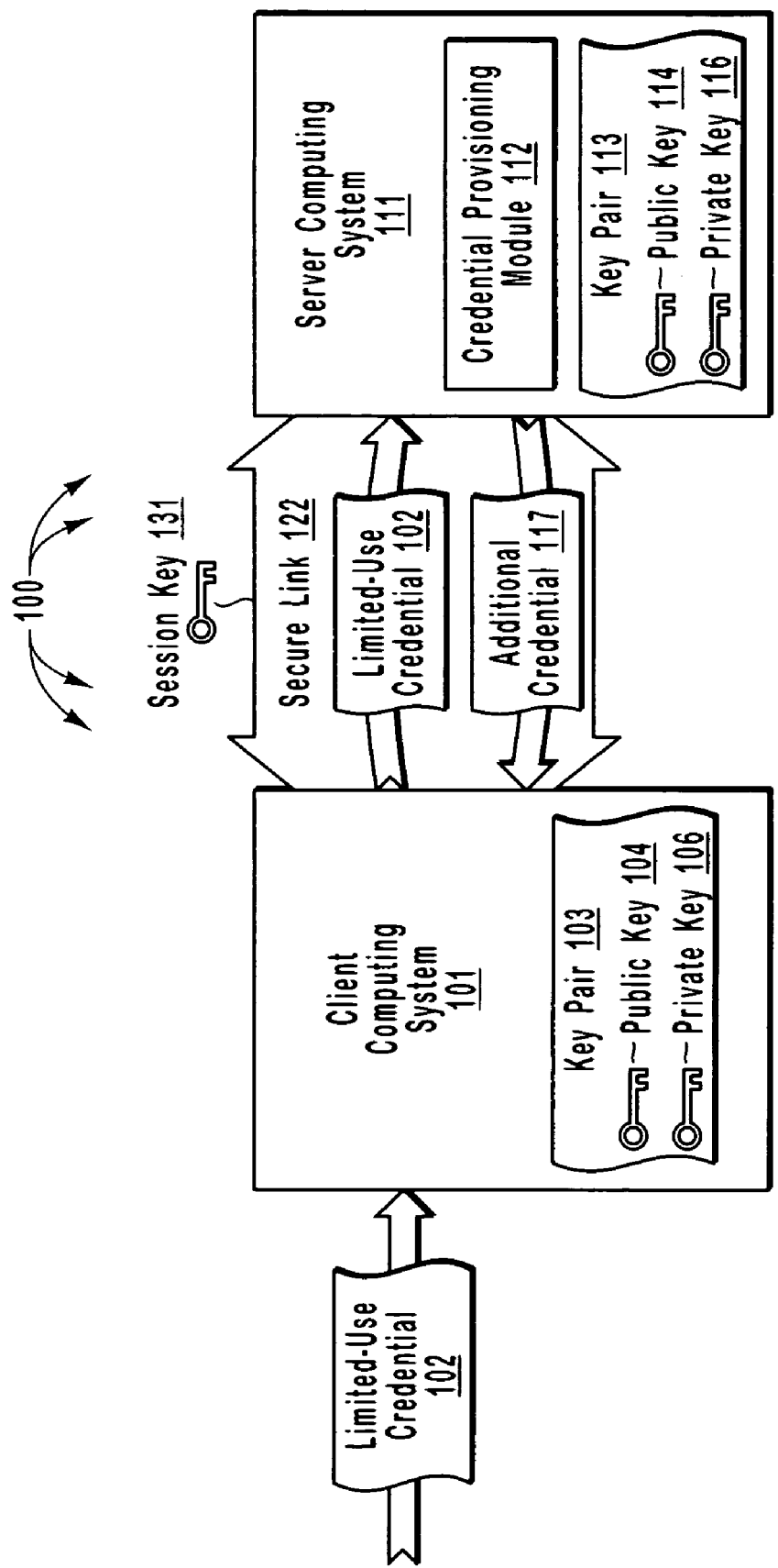
FIG. 1 illustrates example computer architecture that facilitates more efficient and secure authentication of a computing system in accordance with the present invention.

The principles of the present invention relate to systems, methods, and computer program products for more efficiently and securely authenticating computing systems. Embodiments within the scope of the present invention include computer-readable media for carrying or having computer-executable instructions or data structures stored thereon. Such computer-readable media may be any available media, which is accessible by a general-purpose or special-purpose computing system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computing system.

In this description and in the following claims, a "network" is defined as one or more data links that enable the transport of electronic data between computing systems and/or modules. When information is transferred or provided over a network or another communications connection (either hardwired, wireless, or a combination of hardwired or wireless) to a computing system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computing system or special-purpose computing system to perform a certain function or group of functions. The computer executable instructions may be, for example, binaries, intermediate format instructions such as assembly language, or even source code.

In this description and in the following claims, a "computing system" is defined as one or more software modules, one or more hardware modules, or combinations thereof, that work together to perform operations on electronic data. For example, the definition of computing system includes the hardware components of a personal computer, as well as software modules, such as the operating system of the personal computer. The physical layout of the modules is not important. A computing system may include one or more computers coupled via a network. Likewise, a computing system may include a single physical device (such as a mobile phone or Personal Digital Assistant "PDA") where internal modules (such as a memory and processor) work together to perform operations on electronic data.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Those skilled in the art will appreciate that the invention may be practiced in network computing environments with many types of computing system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates example computer architecture 100 that facilitates more efficient and secure authentication of a computing system in accordance with the present invention. As depicted in computer architecture 100, client computing system 101 includes key pair 103. Key pair 103 includes public key 104 and corresponding private key 106, for example, a Diffie-Hellman key pair. Server computing system 111 includes credential provisioning module 112 and key pair 113. Credential provisioning module 112 can be configured to receive a first type of credential, such as, for example, a limited-use credential, and, based on the first type of credential, provision a second type of credential, such as, for example, a more permanent credential. Similar, to key pair 103, key pair 113 includes public key 114 and corresponding private key 116, for example, a Diffie-Hellman key pair.

Figure 2:
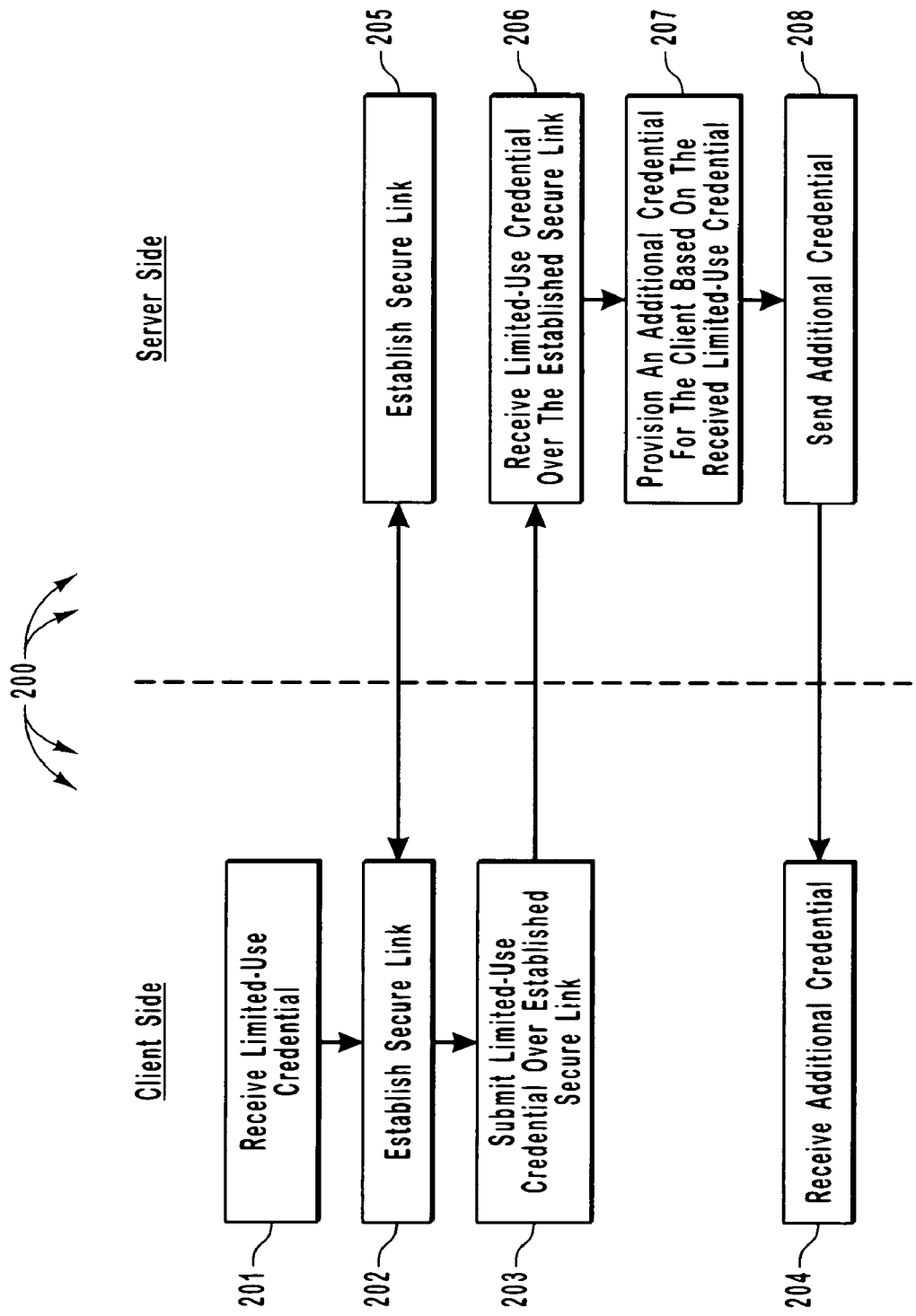
FIG. 2 illustrates a flowchart of an example method for provisioning credentials in accordance with the present invention.

FIG. 2 illustrates a flowchart of an example method 200 for provisioning credentials in accordance with the present invention. The method 200 will be described with respect to the computing systems and modules in computer architecture 100. The method 200 includes an act of receiving a limited-use credential (act 201). For example, client computing system 101 can receive limited-use credential 102.

The use of a limited-use credential can be limited in any number of ways. For example, limited-use credential can be valid for a specified number of uses, for a specified period of time, or until the occurrence of a specified event. A limited-use credential can be limited to any number of valid uses (e.g., three uses), based on applicable security policies. Limited-use credentials that are valid for authenticating only once may be referred to as "single-use credentials". After the specified numbers of uses, the limited-use credential is no longer accepted as a valid credential.

A limited-use credential can be limited to any specified time period (e.g., five minutes), based on applicable security policies. After a specified time period expires, the limited-use credential is no longer accepted as a valid credential. Any specified event can limit the use of a limited-use credential, based on applicable security policies. For example, a limited-use credential can be rejected after more permanent credentials are provisioned.

A limited-use credential can be received out-of-band via communication methods, such as, for example, telephonic communication or mail. Alternately, trusted computerized communication methods can also be used to receive a limited-use credential (e.g., encrypting the limited-use credential in an electronic mail message).

The method 200 includes an act of a client side establishing a secure link (act 202) and a server side establishing a secure link (act 205). For example, client computing system 101 and server computing system 111 can establish secure link 122. Establishment of a secure link can include client computing system 101 and server computing system 111 exchanging public keys to establish a session key. For example, public key 104 and public key 114 can be exchanged to establish session key 131. In some embodiments, establishment of a session key may be enough for subsequent authentication, such as, for example, when client computing system 101 and server computing system 111 are configured with static Diffie-Hellman keys.

Alternately, other keys can be derived to provide other proof. For example, in response to a challenge from a server computer system, a client computing system can encrypt a password using an encryption key derived from the Diffie-Hellman session key and the password and send the encryption key the server computer system. Accordingly, when the server computing system receives the encrypted password, the server computing system can decrypt the password and compare the password to a credential database to determine if the password is valid.

Similarly, a client computing system can encrypt a trust anchor using an encryption key derived from a shared secret and the Diffie-Hellman session key and send the encrypted trust anchor to a server computing system. Accordingly, when the server computing system receives the encrypted trust anchor, the server computing system can decrypt and validate the trust anchor. A trust anchor can include authentication related data, such as, for example, a certificate, (e.g., an X.509 certificate), a security token (e.g., a WS-Security token), a hash (e.g., SHA-1) and Uniform Resource Identifier ("URI") (e.g., a Uniform resource Locator ("URL")) of a certificate, or a hash and URI of a security token.

Likewise, a client computing system can send a new trust anchor that is signed with or includes a digest of a previously established trust anchor. Accordingly, the server computing system can validate the new trust anchor based on the signature or hash of the previously established trust anchor.

Referring back to FIG. 2, the method 200 includes an act of submitting the limited-use credential over the established secure link (act 203). For example, client computing system 101 can submit limited use credential 102 to sever computer system 111 over secure link 122. As previously described, an encryption key derived from the Diffie-Hellman session key and a password can be used to encrypt the password. Thus, it may be that limited-use credential 102 is encrypted using an encryption key derived from session key 131 and limited-use credential 102.

The method 200 includes an act of receiving a limited-use credential over the established secure link (act 206). For example, server computing system 111 can receive limited-use credential 102 from client computing system 101 over secure link 122. Also, in response to a previous request, server computing system 111 can receive an encryption key (e.g., used to encrypt limited-use credential 102) from client computing system 101.

The method 200 includes an act of provisioning an additional credential for the client based on the received limited-use credential (act 207). For example, credential provisioning module 112 can provision a more permanent credential (or credentials) for client computing system 101 based on limited-use credential 102. When appropriate, server computing system 111 can decrypt limited-use credential 102 using a previously received encryption key.

Credential provisioning module 112 can compare limited-use credential 102 to a credential database to determine if limited-use credential 102 is valid. When limited-use credential 102 is not valid, server computing system 111 may terminate processing of limited-use credential 102. Depending on security policies, server computing system 111 may or may not notify client computing system 101 that processing of limited-use credential 102 was terminated. On the other hand, when limited-use credential 102 is valid, there is increased reliability in the identity of client computing system 101. Accordingly, server computing system can generate a more permanent credential (or credentials) for client computing system 101. For example, credential provisioning module 112 can generate additional credential 117.

Additional credential 117 can be the same type of credential as limited-use credential 102. For example, in response to receiving an appropriate single-use password, server computing system 111 can issue a more permanent password. Alternately, additional credential 117 can be a different type of credential. For example, in response to receiving an appropriate single-use password, server computing system 111 can issue a certificate, a token (e.g., a WS-Security token or Kerberos token), a hash and URI of a certificate, or a hash and URI of a token.

Other credential supporting data, such as, certificate chains, certificate revocation list, online certificate status protocol responses, WS-security tokens, and metadata that is to be associated with an exchange, can also be identified. Identified metadata can include eXtensible Mark-up Language ("XML") instructions.

The method 200 includes an act of sending an additional credential (act 208). For example, server computing system 111 can send additional credential 117 to client computing system 101. The method 200 includes an act of receiving an additional credential (act 204). For example, client computing system 101 can receive additional credential 117 from server computing system 111.

Figure 3:
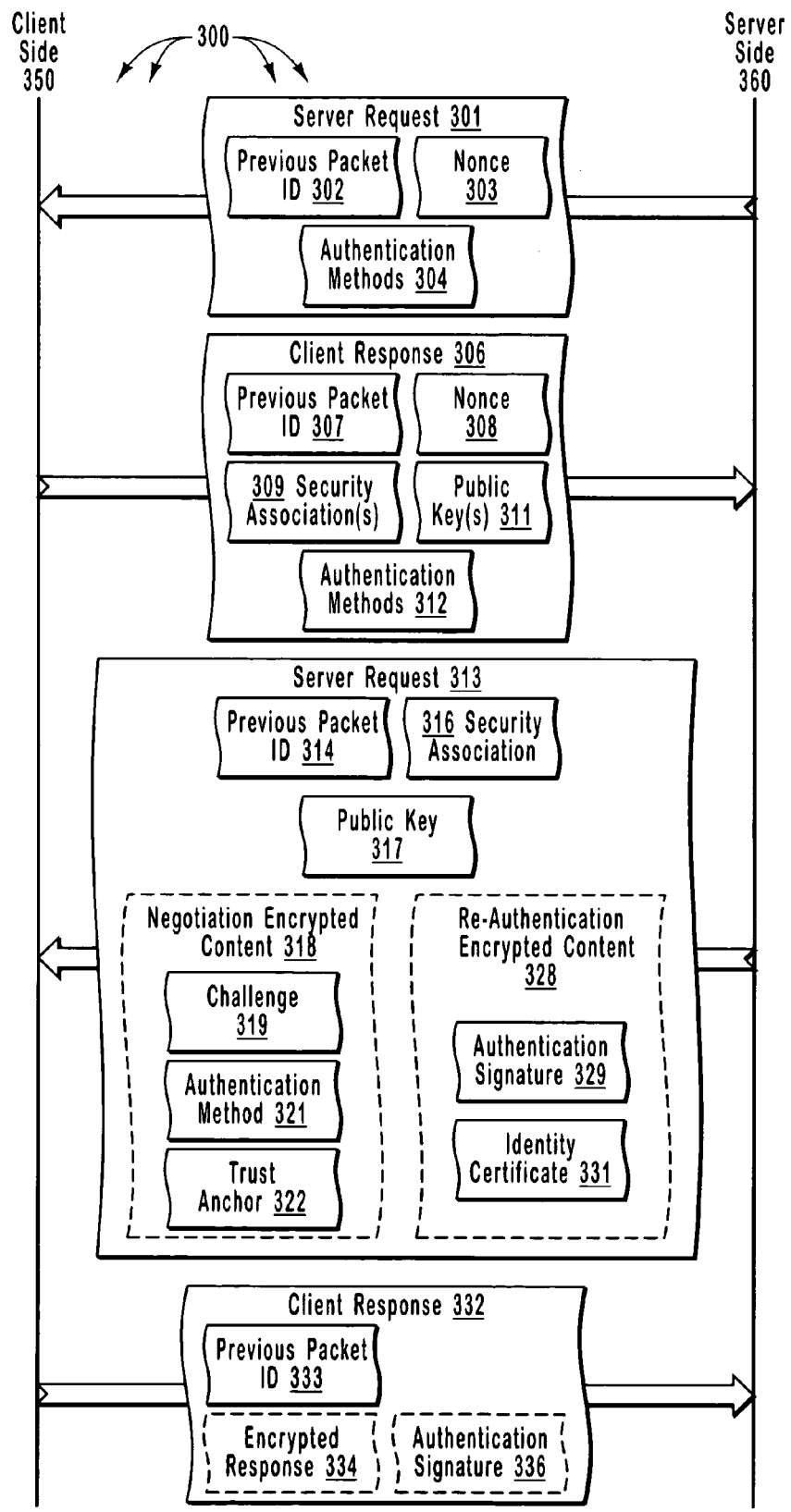
FIG. 3 illustrates a message exchange for automatically negotiating authentication methods.

Accordingly, embodiments of the present invention can facilitate access to a network when access might otherwise be prevented. For example, a limited-use (or single-use) credential can be utilized by a wireless computing system to facilitate access to a certificate used for wirelessly accessing a network. Further, limited-use credentials can reduce computing system vulnerability to dictionary attacks. For example, a limited-use credential may no longer be valid at the time a malicious user eventually cracks the limited-use credential. In particular, since a single-use credential becomes invalid after it is used the once, single-use credentials can significantly reduce vulnerability to dictionary attacks FIG. 3 illustrates a message exchange 300 for negotiation authentication mechanisms. It should be understood that message exchange 300 can occur before or after the exchange of other messages during authentication. For example, a client computing system and server computing system can exchange one or more Extensible Authentication Protocol ("EAP") request/response pairs that preliminarily identify the client computing system and server computing system to one another.

The requests and responses depicted in message exchange 300 can be messages of an authentication protocol. Each message can include the version number of the authentication protocol (e.g., representing supported payload types), a message body, and a Hashed Message Authentication Code ("HMAC") of a portion of the message body. An HMAC can be generated using any cryptographic hash function, such as, for example, MD5, SHA-1, etc. The messages of the authentication protocol can be embedded within EAP messages.

Server side 360 can send server request 301 to client side 350. Server request 301 includes previous packet ID 302, nonce 303, and authentication methods 304. Previous packet ID 302 can indicate the packet ID corresponding to the last packet that was exchanged between client side 350 and server side 360 (e.g., the packet ID of packet in a previous request/response exchange). Nonce 303 can be random data generated at server side 360. Authentication methods 304 can include the proposed authentication mechanisms supported at server side 360. A server side can support any number of different authentication mechanisms (e.g., challenges and responses as previously described, MS-CHAP v2, Authentication with MD5, Authentication with Generic Token Card, Authentication with Kerberos, Authentication with X.509, and Authentication with WS-Security).

In response to server request 301, client side 350 can send client response 306 to server side 360. Client response 306 can include previous packet ID 307, nonce 308, security association(s) 309, public key(s) 311, and authentication methods 312. Previous packet ID 307 can indicate the packet ID corresponding to server request 301. Nonce 308 can be random data generated at server side 360. Security Associations(s) 309 can include proposed security associations that are supported at client side 350. Table 1 indicates some of the security associations that can be supported.

TABLE 1

128 bit AES CBC Mode
Diffie-Hellman Group 2 (1024 bit)
SHA-1 + HMAC
SHA-1 Hash
128 bit AES CBC Mode
Diffie-Hellman Group 5 (1536 bit)
SHA-1 + HMAC
SHA-1 Hash
128 bit AES CBC Mode
Diffie-Hellman Group 14 (2048 bit)
SHA-1 + HMAC
SHA-1 Hash
128 bit AES CBC Mode
ECC Diffie-Hellman Group 4 (185 bit)
SHA256 HMAC
SHA256 Hash Public key(s) 311 can include one or more public keys. Public key(s) 311 can include a key of an appropriate length (e.g., 1024 bits, 2048 bits, etc.) for each supported security association. Public keys(s) 311 can be one more Diffie-Hellman public keys including, for example, public key 104. Authentication methods 312 can include authentication mechanisms supported at client side 350 and selected from among the authentication mechanisms included in authentication methods 304.

In response to client response 306, server side 360 can send server request 313. Server request 313 can include previous packet ID 314, security association 316, public key 317, and other authentication data based on the authentication method. Previous packet ID 314 can indicate the packet ID corresponding to client response 306. Security association 316 can indicate a security association supported at server side 360 and selected from among the authentication methods included in security association(s) 309. Public key 317 can be a key of appropriate length for the security association indicated in security association 316. Public key 317 can be a Diffie-Hellman public key, such as, for example, public key 114.

Accordingly, based on the appropriate length key from public key(s) 311 and public key 317, a secure link can be established between client side 350 and server side 360.

Generally, encrypted data sent between client side 350 and server side 360 is encrypted using a tunnel key. The tunnel key can be derived by hashing the concatenation of a Diffie-Hellman shared secret (e.g., session key 131) together with client and server nonces. For example, a tunnel key can be derived according to the following formula:

$$\text{Tunnel Key} = \text{HASH}[DH_{ss} + N_c + N_s]$$

A tunnel key can be a symmetric key. That is the tunnel key can be used to decrypt encrypted data that was encrypted using the tunnel key. Accordingly, client side 350 can encrypt data that is to be sent to server side 360 with the tunnel key and can decrypt content received from the server side 360 with the tunnel key. Similarly, server side 360 can encrypt data that is to be sent to client side 350 with the tunnel key and can decrypt content received from client side 350 using the tunnel key.

When client side 350 and server side 360 are performing a negotiation, server request 313 can include negotiation encrypted content 318. Negotiation encrypted content 318 can include challenge 319, authentication method 321, and trust anchor 322. Challenge 319 can be an HMAC of the previous packet ID (e.g., pervious packet ID 314) using a shared secret (e.g., session key 131). For example, challenge 319 can be configured according to the following formula:

$$\text{Challenge} = \text{HMAC}_{ss}[\text{PPid}]$$

Server side 360 can maintain an appropriate response to the challenge. For example, an appropriate response can be the HMAC of the challenge using the shared secret. An appropriate response can be configured according to the following formula:

$$\text{Response}_s = \text{HMAC}_{ss}[\text{Challenge}]$$

Authentication method 321 can indicate an authentication method that is mutually supported at client side 350 and server side 360. Trust anchor 322 can be a trust anchor as previously described.

When client side 350 is re-authenticating with server side 360 (e.g., authenticating some time after a negotiation), server request 313 can alternately include re-authentication encrypted content 328. Re-authentication encrypted content 328 can include authentication signature 329 and identity certificate 331. Authentication signature 329 can include a signature ID type (e.g., SHA-1 (key ID length=20 octets) or SHA256 (key ID length=32 octets)), a signature key ID, and a signature type (e.g., HMAC, RSA PKCS #1, RSA PSS, or DSA). Identity certificate 331 can include, for example, an X.509 certificate, a Kerberos token, a WS-Security token, a Raw Public Key, a hash and URL or an X.509 certificate, a hash and URL of a WS-Security token, a hash and URL of a raw public key.

It should be understood that other types of encrypted authentication content (instead of negotiation encrypted content 318 or re-authentication encrypted content 328) can alternately be included in server request 313. For example, when bootstrapping a client using an existing username and password, server request 313 may have encrypted content including an authentication signature, an identity certificate, and an authentication method.

When bootstrapping a new client with an X.509 certificate, server request 313 may have encrypted content including a challenge, a trust anchor, an authentication method, and an enrollment request. An enrollment request can include a request type (e.g., Kerberos TGT request, Kerberos AS request, PCKS #10 request, or CMC request), a key type (e.g., RSA signature, DSA, ECDSA, or DH+ECDH), a key sub-type (e.g., PSA signature keys or DH+ECDH keys) and a key size (e.g., 1024 bits). When authenticating with an X.509 certificate, request 313 may have encrypted content including an authentication signature, an identity certificate, and an authentication method.

When bootstrapping a new client with a Kerberos ticket, server request 313 may have encrypted content including a challenge and an enrollment request.

In response to server request 313, client side 350 can send client response 332. Client response 332 can include previous packet ID 333 and data responsive to encrypted content included in server request 313. Previous packet ID 333 can indicate the packet ID corresponding to server request 313. When client side 350 and server side 360 are performing a negotiation, client response 332 can included encrypted response 334 (encrypted with the tunnel key). Encrypted response 334 can be a response to challenge 319.

Client side 350 can generate an appropriate response to challenge 319. For example, an appropriate response can be the HMAC of the challenge 319 using a shared secret. An appropriate response can be configured according to the following formula:

$$\text{Response}_c = \text{HMAC}_{ss}[\text{Challenge}]$$

When client side 350 is re-authenticating with server side 360, client response 332 can include authentication signature 336.

It should be understood that other types of data responsive to encrypted authentication content (instead of encrypted response 334 or authentication signature 336) can alternately be included in client response 332. For example, when bootstrapping a client using an existing username and password, client response 332 can have encrypted responsive data including a challenge, an end-user identity payload, and a domain identity payload. End-user identity payloads and domain identity payloads can include a name type (e.g., fully qualified DNS name, am e-mail address, an IPv4 address, and IPv6 address, a DER encoded X.500 distinguished name, or a realm name).

When bootstrapping a new client with an X.509 certificate, client response 332 can have encrypted responsive data including a response and a certificate request. When authenticating with an X.509 certificate, client response 332 may have encrypted responsive data including an authentication signature and an identity certificate. When bootstrapping a new client with a Kerberos ticket, client response 332 may have encrypted responsive data including a response and a certificate request.

Embodiments of the present invention facilitate the negotiating authentication mechanisms from among a number of different authentication mechanisms. Client computing systems and server computing systems can identify mutually supported authentication mechanisms and use identified mechanisms for authentication. Automated negotiation relieves a user from having to be aware of authentication mechanisms that may be deployed for a network. Accordingly, authentication can be performed more efficiently.

FIG. 4 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 4, an example system for implementing the invention includes a general-purpose computing device in the form of computer system 420, including a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a peripheral bus, and a local bus using any of a variety of bus architectures. The system memory includes read only memory ("ROM") 424 and random access memory ("RAM") 425. A basic input/output system ("BIOS") 426, containing the basic routines that help transfer information between elements within computer system 420, such as during start-up, may be stored in ROM 424.

The computer system 420 may also include magnetic hard disk drive 427 for reading from and writing to magnetic hard disk 439, magnetic disk drive 428 for reading from or writing to removable magnetic disk 429, and optical disk drive 430 for reading from or writing to removable optical disk 431, such as, or example, a CD-ROM or other optical (media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide non-volatile storage of computer-executable instructions, data structures, program modules, and other data for the computer system 420. Although the example environment described herein employs magnetic hard disk 439, removable magnetic disk 429 and removable optical disk 431, other types of computer-readable media for storing data can be used, including magnetic cassettes, flash memory cards, digital versatile disks, Bernoulli cartridges, RAMs, ROMs, and the like. Storage 132 may be a portion of one of the described types of computer-readable media.

Program code means comprising one or more program modules may be stored on hard disk 439, magnetic disk 429, optical disk 431, ROM 424 or RAM 425, including an operating system 435, one or more application programs 436, other program modules 437, and program data 438. A user may enter commands and information into computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Input/output interface 446 logically represents any of a wide variety of possible interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 447 or other display device is also connected to system bus 423 via video interface 448. Monitor 447 can display monochrome and/or color graphical objects, including text, generated by computer system 420. Other peripheral devices (not shown), such as, for example, speakers, printers, and scanners, can also be connected to computer system 420. Printers connected to computer system 447 can print monochrome and/or color graphical objects, including text, generated by computer system 420.

Computer system 420 is connectable to networks, such as, for example, an office-wide or enterprise-wide computer network, a home network, an intranet, and/or the Internet. Computer system 420 can exchange data with external sources, such as, for example, remote computer systems, remote applications, and/or remote databases over such networks.

Computer system 420 includes network interface 453, through which computer system 420 receives data from external sources and/or transmits data to external sources. As depicted in FIG. 4, network interface 453 facilitates the exchange of data with remote computer system 483 via link 451. Network interface 453 can logically represent one or more software and/or hardware modules, such as, for example, a network interface card and corresponding Network Driver Interface Specification ("NDIS") stack. Link 451 represents a portion of a network (e.g., an Ethernet segment), and remote computer system 483 represents a node of the network.

Likewise, computer system 420 includes input/output interface 446, through which computer system 420 receives data from external sources and/or transmits data to external sources. Input/output interface 446 is coupled to modem 454 (e.g., a standard modem, a cable modem, or digital subscriber line ("DSL") modem), through which computer system 420 receives data from and/or transmits data to external sources. As depicted in FIG. 4, input/output interface 446 and modem 454 facilitate the exchange of data with remote computer system 493 via link 452. Link 452 represents a portion of a network and remote computer system 493 represents a node of the network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

In accordance with the present invention, modules, such as, for example, credential provisioning module 112 as well as associated program data, such as, for example, limited-use credential 102, key pairs 103 and 113, server requests 301 and 313, and client responses 306 and 332, can be stored and accessed from any of the computer-readable media associated with computer system 420. For example, portions of such modules and portions of associated program data may be included in operating system 435, application programs 436, program modules 437 and/or program data 438, for storage in system memory 422.

When a mass storage device, such as, for example, magnetic hard disk 439, is coupled to computer system 420, such modules and associated program data may also be stored in the mass storage device. In a networked environment, program modules depicted relative to computer system 420, or portions thereof, can be stored in remote memory storage devices, such as, system memory and/or mass storage devices associated with remote computer system 483 and/or remote computer system 493. Execution of such modules may be performed in a distributed environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

The invention claimed is:

1. In a client computing system, a method for participating in authentication with a server computing system, the method comprising:

an act of the client computing system receiving a first server request that includes at least a first indication of the authentication mechanisms deployed at the server computing system and a server nonce;

an act of the client computing system sending a first response to the server computing system and that includes a client public key, a client nonce and a selected set of the authentication mechanisms that were included in the first indication of the authentication mechanisms received from the server computing system and that are also deployed at the client computing system;

an act of identifying a tunnel key that can be used to encrypt content transferred between the client computing system and the server computing system, the tunnel key comprising a hash of a concatenation of a session key together with the server nonce and the client nonce;

an act of receiving a second server request that includes encrypted authentication content, the encrypted authentication content being encrypted with the tunnel key and including a server challenge, a mutually deployed authentication method and a trust anchor;

an act of decrypting the encrypted authentication content with the tunnel key to reveal unencrypted authentication content, the unencrypted authentication content including the mutually deployed authentication mechanism the server challenge and the trust anchor; and an act of sending a second response to the second server request, the second response including encrypted response data that is responsive to the unencrypted authentication content, including at least one of a client challenge, a hashed message authentication code that corresponds to the server challenge, or a client authentication signature, the encrypted response data being used for authenticating the client computing system with the server computing system according to the mutually deployed authentication mechanism.

2. The method as recited in claim 1, wherein the first server request includes a previous packet ID corresponding to a previous session existing between the client and the server computing systems.

3. The method as recited in claim 1, wherein the authentication mechanisms deployed at the server computing system include one more authentication mechanisms selected from among MS-CHAP v2, Authentication with MD5, Authentication with Generic Token Card, Authentication with Kerberos, Authentication with X.509, and Authentication with WS-Security.

4. The method as recited in claim 1, wherein the authentication mechanisms deployed at the client computing system include one more authentication mechanisms selected from among MS-CHAP v2, Authentication with MD5, Authentication with Generic Token Card, Authentication with Kerberos, Authentication with X.509, and Authentication with WS-Security.

5. The method as recited in claim 1, wherein the first response includes a plurality of public keys.

6. The method as recited in claim 1, wherein the act of receiving the second server request comprises receiving encrypted authentication content corresponding to an authentication method selected from among: boot-strapping a client with an existing user-name and password, boot-strapping a client with an X.509 certificate, authenticating with an X.509 certificate, and boot-strapping a new client with a Kerberos token.

7. The method as recited in claim 6, wherein the second server request includes a previous packet ID.

8. The method as recited in claim 6, wherein the act of sending the second response includes sending encrypted responsive data for an authentication method selected from among: boot-strapping a client with an existing user-name and password, boot strapping a client with an X.509 certificate, authenticating with an X.509 certificate, and boot-strapping a new client with a Kerberos token.

9. The method as recite in claim 7, wherein the second response includes the previous packet ID.

10. In a server computing system, a method for participating in authentication with a client computing system, the method comprising:

an act of the server computing system sending a first request that includes at least a first indication of the authentication mechanisms deployed at the server computing system and a server nonce;

an act of the server computing system receiving a first client response to the first request and that includes a client public key, a client nonce and a selected set of the authentication mechanisms that were included in the first indication of the authentication mechanisms deployed by the server and that are also deployed at the client computing system;

an act of identifying a tunnel key that can be used to encrypt content transferred between the client computing system and the server computing system, the tunnel key comprising a hash of a concatenation of a session key together with the server nonce and the client nonce;

an act of sending a second request that includes encrypted authentication content, the encrypted authentication content being encrypted with the tunnel key, the encrypted authentication content including a server challenge, a mutually deployed authentication mechanism and a trust anchor; and an act of receiving a second client response, the second client response including encrypted response data that is responsive to the encrypted authentication content and that includes at least one of a client challenge, a hashed message authentication code corresponding to the server challenge, or a client authentication signature, the encrypted response data being used for authenticating the client computing system with the server computing system according to the mutually deployed authentication mechanism.

11. The method as recited in claim 10, wherein the first request includes a previous packet ID corresponding to a previous session existing between the client and the server computing system.

12. The method as recited in claim 10, wherein the authentication mechanisms deployed at the server computing system include one more authentication mechanisms selected from among MS-CHAP v2, Authentication with MD5, Authentication with Generic Token Card, Authentication with Kerberos, Authentication with X.509, and Authentication with WS-Security.

13. The method as recited in claim 1, wherein the authentication mechanisms deployed at the client computing system include one more authentication mechanisms selected from among MS-CHAP v2, Authentication with MD5, Authentication with Generic Token Card, Authentication with Kerberos, Authentication with X.509, and Authentication with WS-Security.

14. The method as recited in claim 10, wherein the first client response includes a plurality of public keys.

15. The method as recited in claim 10, wherein the act of sending a second request comprises sending encrypted authentication content corresponding to an authentication method selected from among: boot-strapping a client with an existing user-name and password, boot-strapping a client with an X.509 certificate, authenticating with an X.509 certificate, and boot-strapping a new client with a Kerberos token.

16. The method as recited in claim 15, wherein the second request includes a previous packet ID.

17. The method as recited in claim 15, wherein the act of receiving a second client response includes receiving encrypted responsive data for an authentication method selected from among: boot-strapping a client with an existing user-name and password, boot strapping a client with an X.509 certificate, authenticating with an X.509 certificate, and boot-strapping a new client with a Kerberos token.

18. The method as recited in claim 17, wherein the second client response includes the previous packet ID.

19. The method recited in claim 1, wherein the first response also includes a plurality of security associations and wherein the second request includes one of the plurality of security associations selected from the plurality of security associations.

20. The method recited in claim 1, wherein the second response includes the client challenge.

21. The method recited in claim 1, wherein the second response includes the hashed message authentication code.

22. The method recited in claim 1, wherein the second response includes the client authentication signature.

* * * * *